United States Patent

Nanba et al.

[11] Patent Number: 5,928,308
[45] Date of Patent: Jul. 27, 1999

[54] NAVIGATION SYSTEM FOR VEHICLES

[75] Inventors: Akimasa Nanba; Mitsuhiro Nimura; Yasunobu Ito, all of Anjo, Japan

[73] Assignee: Aisin AW Co., Ltd., Japan

[21] Appl. No.: 08/704,010

[22] Filed: Aug. 26, 1996

[30] Foreign Application Priority Data

Aug. 25, 1995 [JP] Japan .................................. 7-217867
Sep. 29, 1995 [JP] Japan .................................. 7-253369
Sep. 29, 1995 [JP] Japan .................................. 7-253370

[51] Int. Cl.$^6$ .................................................. G06F 165/00
[52] U.S. Cl. ............................. 701/211; 701/209; 340/990; 340/995
[58] Field of Search ..................................... 701/200, 207, 701/208, 209, 211; 73/178 R; 340/988, 990, 995

[56] References Cited

U.S. PATENT DOCUMENTS

| | | | |
|---|---|---|---|
| 5,444,629 | 8/1995 | Kishi et al. | 701/211 |
| 5,452,212 | 9/1995 | Yokoyama et al. | 701/211 |
| 5,452,217 | 9/1995 | Kishi et al. | 701/207 |
| 5,687,083 | 11/1997 | Kishi et al. | 701/200 |
| 5,729,109 | 3/1998 | Kaneko et al. | 701/211 |
| 5,739,772 | 4/1998 | Nanba et al. | 701/209 |
| 5,774,071 | 6/1998 | Konishi et al. | 701/211 |

*Primary Examiner*—Gary Chin
*Attorney, Agent, or Firm*—Lorusso & Loud

[57] ABSTRACT

A navigation system calculates a route from a present position of a vehicle to a destination and provides guidance based on the calculated route. When the vehicle is within a given distance from a next approaching branch point requiring guidance, branch points existing within a given distance from next approaching branch point are determined and direction information for the branch points is acquired. The acquired direction information is compared with direction information at the next approaching branch point, and a common direction information is displayed based on the result of the comparison. Also, the navigation system according to the present invention detects a name of an interchange where the vehicle is to exit from the course and a distance to said interchange based on the present position of the vehicle in case the road where the vehicle is currently driven along is an expressway or a toll road. The navigation system according to the present invention calculates a route from the present position to the destination and properly calculates and provides guidance for the expected time of arrival at the destination as the vehicle moves.

10 Claims, 13 Drawing Sheets

Guidance screen at P1

Guidance screen at P2

FIG. 4(A)
Guidance road data

| No. of roads (n) | |
|---|---|
| 1 | Road number |
| | Length |
| | Road attribute data |
| | Configuration data address & size |
| | Guidance data address & size |
| | ⋮ |
| n | |

FIG. 4(B)
Configuration data

| | No. of nodes (m) |
|---|---|
| 1 | East longitude |
| | North latitude |
| | ⋮ |
| m | |

FIG. 4(C)
Guidance data

| Intersection name |
|---|
| Precaution point data |
| Road name data |
| Road name audio data address & size |
| Destination data address & size |

FIG. 4(D)
Designation data

| No. of destinations (k) | |
|---|---|
| 1 | Destination road number |
| | Destination name |
| | Destination name audio data address & size |
| | Destination direction data |
| | Destination guidance data |
| | ⋮ |
| k | |

FIG. 4(E)
Destination direction data

-1 : Invalid
0 : Not necessary
1 : Straight ahead
2 : Rightward direction
3 : Diagonally rightward direction
4 : Direction to return to right
5 : Leftward direction
6 : Diagonary leftward direction
7 : Direction to return to left

FIG. 5 (A)

Road attribute data

Yes/no information Yes: ○

| Overpass/ underpass data | Overpass | |
|---|---|---|
| | Road alongside overpass | |
| | Underpass | ○ |
| | Road alongside underpass | |
| No. of lanes | 3 lanes or more | |
| | 2 lanes | ○ |
| | 1 lane | |
| | No center line | |

FIG. 5 (B)

Road name data

| Road type | In-type number |
|---|---|

| | | |
|---|---|---|
| Expressway | Main line | 1 |
| | Ancillary road | 2 |
| Municipal expressway | Main line | 3 |
| | Ancillary road | 4 |
| Toll road | Main line | 5 |
| | Ancillary road | 6 |
| General road { | National road | 7 |
| | Prefectural road | 8 |
| | Others | 9 |

Precaution data

| Railroad crossing | ○ |
|---|---|
| Tunnel entrance | |
| Tunnel exit | |
| Road width reduced point | |
| No suggestion | |

Running guidance data

| Bear right | |
|---|---|
| Bear left | |
| Bear toward center | ○ |
| No suggestion | |

Guidance screen at P1

Guidance screen at P2

Guidance screen at P

Direction Metropolitan Expressway

Guidance screen at Q

Direction Metropolitan Expressway

FIG. 15

List of IC names

| Name of expressway | IC to join the course | IC to be diverted from the course | Position |
|---|---|---|---|
| Metropolitan Expressway | Kitaikebukuro<br><br>Kasumigaseki<br>⋮ | Nishikanda<br><br>Shinjuku<br>⋮ | $x_1$ $y_1$<br>$x_2$ $y_2$<br>$x_3$ $y_3$<br>$x_4$ $y_4$<br>⋮ |
| Chuo Expressway | Kunitachi<br>⋮ | Sagamiko<br>⋮ | $x_5$ $y_5$<br>⋮ |

NAVIGATION SYSTEM FOR VEHICLES

BACKGROUND OF THE INVENTION

The present invention relates to vehicle navigation systems providing directional guidance at branch points such as intersections along with other route guidance while the vehicle travels along a route determined by a search conducted in response to input of place data such as destination data or transit points.

In the past, various types of route guidance systems have been proposed to facilitate driving along a road unfamiliar to the driver. In such systems, the driver is guided along a route to a destination after inputting the destination. Some of the route guidance systems provide directional guidance when the vehicle passes through branch points such as intersections.

As shown in FIG. 1 for an example of a guidance route going to or through a destination "B" wherein the guidance route branches to the right at a point P1 and further branches to the left at a point P2 relatively near to the point P1, the prior art directional guidance is as follows: While approaching branch point P1, the guidance system has an option of displaying either a first sign of destination "C" with an arrow pointing straight ahead or a second sign of destinations "A" and "B" with an arrow pointing to the right and, in this example, chooses to display the second sign of "A" and "B" with the arrow pointing to the right as shown in FIG. 2(a) as the guidance sign. Next while approaching the branch point P2, the guidance sign for "B" with the arrow pointing to the left is displayed as shown in FIG. 2(b).

In the prior art directional guidance displaying signs with two or more destination names, all the destination names on such signs are displayed, for example, "A" and "B" are displayed at the first branch point P1 where guidance is provided. Because two or more destination names are displayed at such branch points, it is often difficult to read all the destination names with a brief glance, for example, the driver may miss the instruction to turn right to "B" until the vehicle has actually passed the first branch point P1. Also when the next branch point P2 closely follows point P1, the guidance system displays the sign for destination "B" with the left arrow only briefly before reaching the branch point P2.

Prior art route guidance systems have displayed the distance and time required to the destination. In case an expressway is included in the guidance route, the name of the nearest interchange ("IC") is displayed while driving along the expressway, but the name of the IC where the vehicle should exit from the expressway is not displayed until the vehicle is within a given distance of the IC. Guidance information displayed while on an expressway is skimpy, and the driver often cannot obtain guidance even when he or she wants to confirm the guidance information.

Also, prior art route guidance systems have displayed the expected time of arrival at the destination as calculated from a preset average vehicle velocity. However, there may be some deviation in the suggested time of arrival depending upon conditions or situations of the road leading to the destination.

It is an object of the present invention to provide a navigation system which can ensure easy to understand and reliable direction guidance.

It is another object of the present invention to provide a navigation system by which it is possible to determine whether or not a vehicle should be driven in accordance with information on a specific destination at a first guide branch point.

It is still another object of the present invention to provide a navigation system by which it is possible to identify information of a direction to be driven in advance.

It is a further object of the present invention to provide a navigation system which, while driving along an expressway or a toll road, displays on a guidance screen the name of an IC where the vehicle should exit from the expressway or toll road.

It is a still further object of the present invention to provide a navigation system which informs the driver of information on driving of the vehicle and of the expected time of arrival.

SUMMARY OF THE INVENTION

The navigation system according to the present invention comprises a guidance control, whereby, when the vehicle approaches a guidance object branch point, guide branch points existing within a given distance following the approaching guidance object branch point are determined, route guidance information of such closely spaced guide branch points is acquired and compared with the route guidance information of the approaching guidance object branch point to be guided next, and the route guidance information of the approaching object branch point is changed based on the result of the comparison.

The navigation system according to another aspect of the present invention comprises route calculating facilities for calculating a route from an input destination and for preparing route information including a list of names and positions of ICs where the vehicle is to exit from an expressway or a toll road along the calculated route, facilities for displaying the name of an IC where the vehicle is to exit, and facilities for searching for the name of the next IC where the vehicle is to exit from an expressway or a toll road by comparing the present position with the list of names and positions of ICs when travelling along an expressway or a toll road, and for providing guidance by calculating the distance to said IC.

The navigation system according still another aspect of the inventions searches a route in response to input of destination data and provides route guidance along with the expected time of arrival at the destination calculated as the vehicle moves.

Also, the navigation system according to a further aspect of the present invention comprises a vehicle velocity setting means for setting an average velocity for each type of road, a present position detecting means for calculating the present position of the vehicle, a route calculating means for determining a route and a distance for each type of road in the determined route, and a guidance control means for calculating the remaining distance for each type of road on the determined route and for obtaining and displaying an expected time of arrival by calculating the time required to reach the destination from the preset average vehicle velocity for each type of road and the calculated remaining distance and by adding the calculated time to the current time.

BRIEF DESCRIPTION OF THE DRAWINGS

FIGS. 4(A), 4(B), 4(C), 4(D) and 4(E) are listings of guidance road data, configuration data, guidance data, destination data, and destination direction data, respectively, illustrating an arrangement of major file data according to the present invention;

FIGS. 5(A) and 5(B) are listings of Road attribute data and road name data, respectively, illustrating arrangements of such file data according to the present invention;

FIG. 15 is a list illustrating a list of names and positions of entrance and exit ICs or a roadway;

DESCRIPTION OF THE PREFERRED EMBODIMENTS

Figure 3:
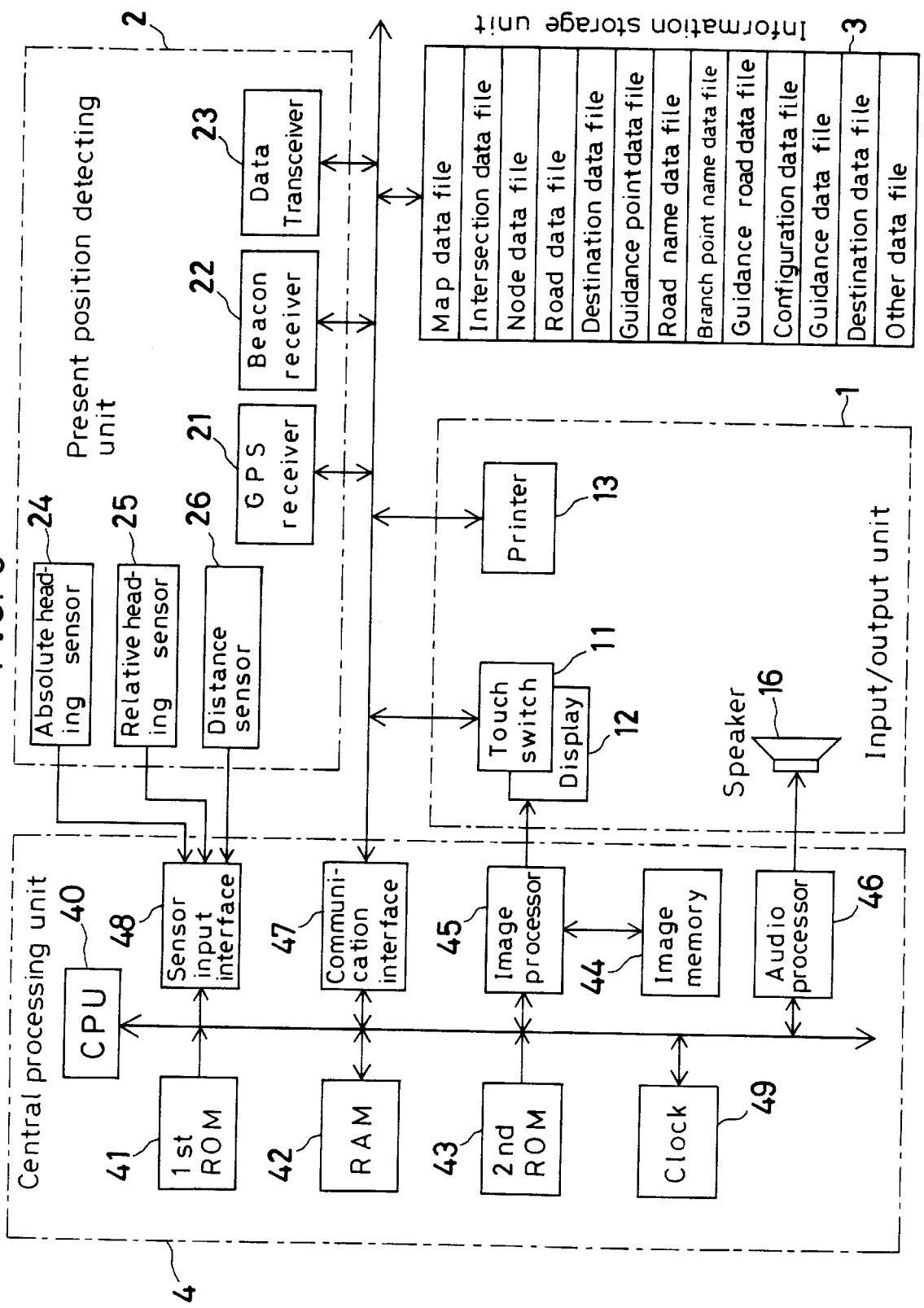
FIG. 3 is a block diagram of a navigation system according to the present invention.

As shown in FIG. 3, a navigation system according to one embodiment of the present invention includes an input/output unit 1 for inputting and outputting information relating to route guidance, a present position detecting unit 2 for detecting information relating to the present position of the vehicle, an information storage unit 3 for storing navigation data necessary for calculating an optimal route and displaying guidance data necessary for guidance, and a central processing unit 4 for route search processing and display guidance processing necessary for route guidance and for controlling the entire system.

The input/output unit 1 enables entry of navigation instructions to the central processing unit 4 such as input of the desired destination of the driver and outputs guidance information in audio and/or on screen when the driver needs such information along with printing out the data after the processing. The input unit includes a touch switch or screen 11 or any other type of entry switch or keyboard to input the destination using a telephone number or map coordinates or to request route guidance. The output unit includes a display unit 12 for displaying the input data on screen or for displaying route guidance information automatically on screen at the request of the driver, a printer 13 for printing out the data processed by the central processing unit 4 or the data stored in the information storage unit 3, and a speaker 16 for outputting audio route guidance information.

It is also possible to add a voice recognition device for inputting in voice or a card reader for reading data recorded on IC card or magnetic card. Also, it is possible to add a data communication device, which stores data necessary for navigation and exchanges data to and from a remote information center where data necessary for navigation is stored and is offered via a communication line at the request of the driver or to and from an information source such as electronic notebook where data specific to the driver such as map data, destination data, etc. are stored in advance.

The display unit 12 comprises a color CRT or a color liquid crystal display, and all screens necessary for navigation such as target name input screen, route setting screen, sector view screen, intersection view screen, and direction guidance screen at a branch point such as an intersection are output in color display based on map data and guidance data processed by the central processing unit 4. Buttons are displayed on the screen for setting the route guidance or for instructing guidance on screen by the touch unit 11 during route guidance. In particular, transit intersection information such as names of transit intersections is given in a pop-up color display window on the sector view screen when necessary.

This display unit 12 is installed on an instrument panel near the driver's seat. By looking at the sector displayed on the screen, the driver can confirm the present position of the vehicle and can obtain information on the route ahead. The display unit 12 is provided with the touch panel 11 to overlay the display of functional buttons. By touching portions of the touch panel overlying displayed buttons, the driver inputs information and controls operation of the navigation system.

The present position detecting unit 2 is provided with a GPS receiver 21 utilizing the global positioning system (GPS), a beacon receiver 22, a data transceiver for receiving a GPS compensation signal utilizing a cellular phone (automobile phone) or FM multiplex signal, an absolute heading sensor 24 comprising a geomagnetic sensor, a relative heading sensor comprising wheel sensor, steering sensor, gyro, etc. and a distance sensor for detecting traveled distance from the number of revolutions of the vehicle wheels.

The information storage unit 3 is a data base where all necessary data for the navigation system are recorded in form of files such as map data, intersection data, node data, road data, destination data, guidance point data, road name data, branch point name data, guidance road data, configuration data, guidance data, destination direction data, road attribute data, precaution data, running guidance data, telephone number data, address data, photograph data, registered point data, etc.

The central processing unit 4 comprises a CPU 40 for executing various computation procedures, a first ROM 41 containing programs to control processing such as route searching and programs for display output control necessary for route guidance and for audio output control necessary for audio guidance and necessary data, a RAM 42 for temporarily storing route guidance information searched such as coordinates, road surface code No., etc. of the preset destination or data under computation, a 2nd ROM 43 for storing display information data necessary for route guidance and map display, an image memory 44 for storing image data used for screen display on the display unit, an image processor 45 for reading the image data from the image memory 44 based on the display output control signal from the CPU 40 and for outputting it to the display unit after image processing, an audio processor 46 for synthesizing audio signals of voice, phrase, sentences, other sounds, etc. from data read from the information storage unit 3 based on the audio output control signal from the CPU and for outputting the audio signals to the speaker 16, a communication interface 47 for sending and receiving input/output data by communication, a sensor input interface 48 for inputting sensor signals form the present position detecting unit 2, and a clock 49 for producing the date and time for internal processing. Route guidance is carried out by screen display and audio output, and the driver can select whether the data should be provided in audio output or not.

FIGS. 4(A), 4(B), 4(C), 4(D), 4(E), 5(A), 5(B), 6(A) and 6(B) show an example of an arrangement of data files stored in the information storage unit 3 of FIG. 3. FIG. 4(A) represents a guidance road data file where data necessary for calculating a route by a route calculating means and for providing route guidance are stored. In each of the number of roads (n), there are provided data such as road number, length, road attribute data, address and size of configuration data, and address and size of guidance data. The road number is set for each direction (outward course and return course) for each road between branch points. The road attribute data serving as auxiliary information data for road guidance are the data, as shown in FIG. 5(A), showing that the road is overpass, road alongside overpass, underpass, or road alongside underpass, and also providing information of the number of lanes. The configuration data has, as shown in FIG. 4(B), coordinate data comprising east longitude and north latitude of one or more nodes of each road.

The guidance data comprises, as shown in FIG. 4(C), intersection (or branch point) name, precaution point data, road name data, address and size of road name audio data, and address and size of destination data. The precaution point data are the data indicating information such as railroad crossing, tunnel entrance, tunnel exit, road width reduced point, or no suggestion as shown in FIG. 6 (A). These are the data to warn the driver of precaution points such as railroad crossing, tunnel, etc., in addition to branch points. The road name data are, as shown in FIG. 5 (B), the data to indicate road type information such as expressway, municipal expressway, toll road, general road (national road, prefectural road, and others) and also information indicating whether expressway, municipal expressway or toll road is a main line or an approach road. It includes road type data and type numbers which correspond to the road types.

The destination data comprises, as shown in FIG. 4 (D), destination road number, destination name, address and size of destination name audio data, destination direction data, and traveling guidance data. The destination name includes the name or symbol of a city, highway, intersection, building, region, etc. The destination direction data are the data to indicate information such as invalid (destination direction data is not used), not necessary (no guidance is necessary), straight ahead, rightward direction, diagonally rightward direction, direction to turn through acute angle to the right, leftward direction, diagonally leftward direction and direction to turn through acute angle to the left. The running guidance data are, as shown in FIG. 6 (B), the data for providing guidance as to which lane the vehicle should be driven along when there are two or more lanes and these are the data to indicate "bear right", "bear left", "bear toward center" or no suggestion.

Figures 6A, 6B, 7:
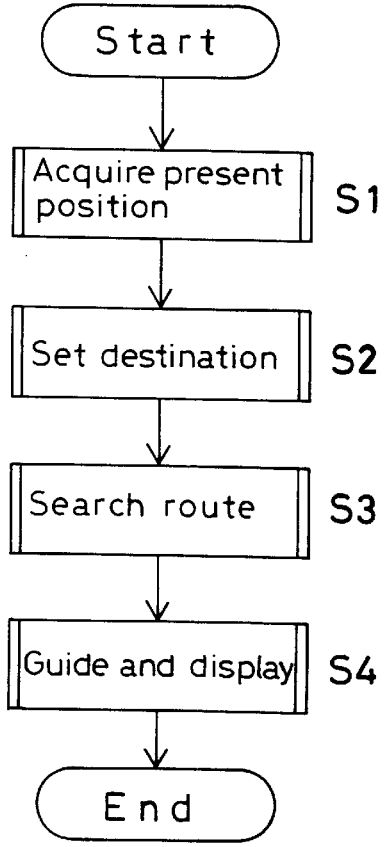
FIGS. 6(A) and 6(B) are listings of precaution data and running guidance data, respectively illustrating arrangements of such file data according to the present invention.
FIG. 7 is a flow chart showing the overall operation of the navigation system according to the present invention.

The overall operation of the navigation system for vehicles of the present invention is illustrated in FIG. 7. When the program of route guidance system is started by CPU 51 of the central processing unit 4, the present position of the vehicle is detected by a present position detecting unit 2, and a map of the vicinity of the present position is displayed. Also, the name and other data of the present position are displayed (Step S1). Next, a destination is set using target name, telephone number, address, registered point, etc. of the place or the facility (Step S2), and an optimal route from the present position to the destination is searched or determined (Step S3). When the vehicle is driven along the determined route, the present position is traced by the present position detecting unit 2, and route guidance and display are repeatedly performed until the vehicle reaches the destination (Step S4). When an additional route out of the planned route is set before the vehicle reaches the destination, a search area is set. Then, re-searching is carried out in the search area, and route guidance is repeated until the vehicle reaches the destination.

The present embodiment provides direction information for route guidance at branch points or intersections in the route guidance and display of the above Step S4. In the following, the guide branch point on the guidance route necessary for the next guidance according to the present position is called "the guidance object branch point", and other branch points requiring guidance on the guidance route are called "guide branch points".

Figure 1:
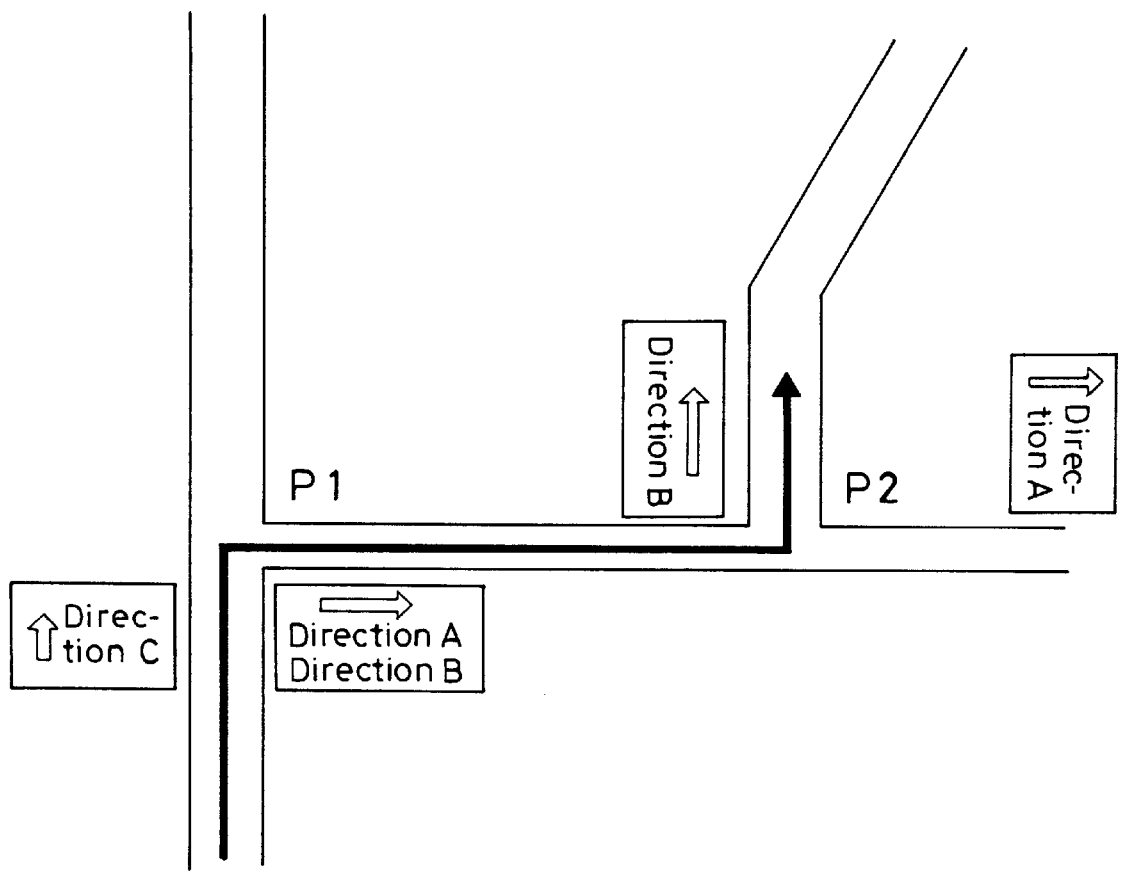
FIG. 1 is a map display showing prior art direction guidance.
Figure 8:
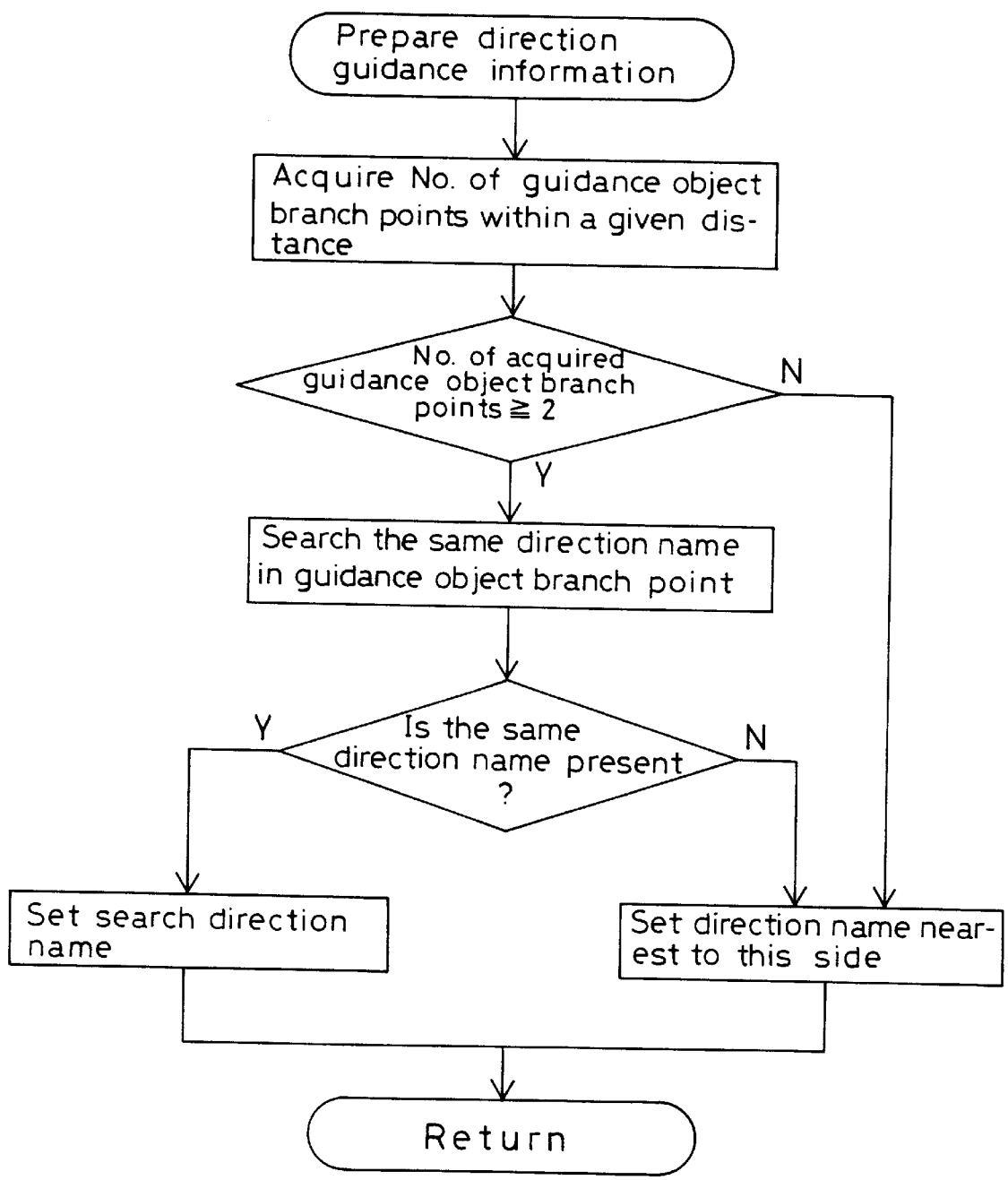
FIG. 8 is a flow chart showing a procedure for preparing direction guidance information according to the present invention.

Direction guidance at each guidance object branch point, in turn, is described with reference to FIG. 8 and FIGS. 9(A) and 9(B). If there is a guide branch point following the guidance object branch point, the procedure to prepare direction guidance as shown in FIG. 8 is started. In this procedure, all guide branch point which is positioned in a given distance, e.g. 300 m in case of general road and within 600 m in case of expressway, from the guidance object branch point such as P1 are determined, Step S81. All branch points falling under the above category are acquired, and it is checked whether the number of the acquired branch points is 2 or more, Step S82. In the example shown in FIG. 9($a$), there is only one guide branch point (P1 only) within the distance D on the guidance route. Accordingly in Step S83, display of the pop-up sign with one or more destination names (guidance or direction information) and the arrow in the desired direction of travel, e.g., the right turn direction sign at the branch point P1, is set for guidance. In the case shown in FIG. 1, the pop-up sign of FIG. 2($a$) includes both destination names "A" and "B". In the example shown in FIG. 9($b$), Step S82 finds guide branch points P1, P2, P3 and P4 within the distance D on the guidance route. Thus in Step S84, the destination names on the right turn sign at the branch point P1 are searched or compared with the destination names on the turn signs for the guidance route at the branch points P2, P3, and P4, and the name or names common to all signs are determined. If this determination finds one or more common destination names in Step S85, then in Step S86 only the common name or names are set for display for guidance; otherwise in the Step S83 all the names are set for display. For example, in the case shown in FIG. 1, only the destination name "B" is displayed for guidance when the vehicle is at the branch point P1 as shown in FIG. 10($a$); the destination name "B" is also displayed at the branch point P2 as shown in FIG. 10($b$).

Figure 2A:
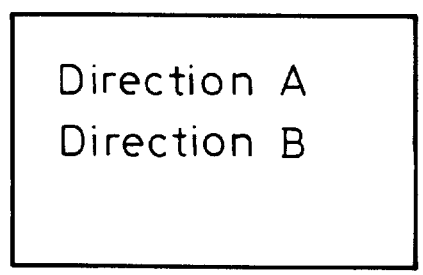
FIGS. 2(a) and 2(b) are screen displays or enlargements of pop-up signs in FIG. 1 illustrating conventional type direction guidance.
Figure 2B:
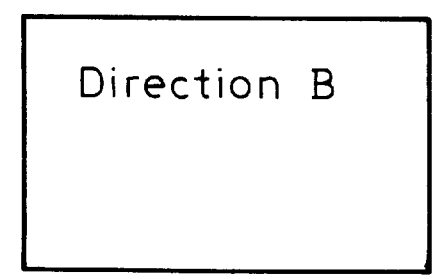
Figure 9:
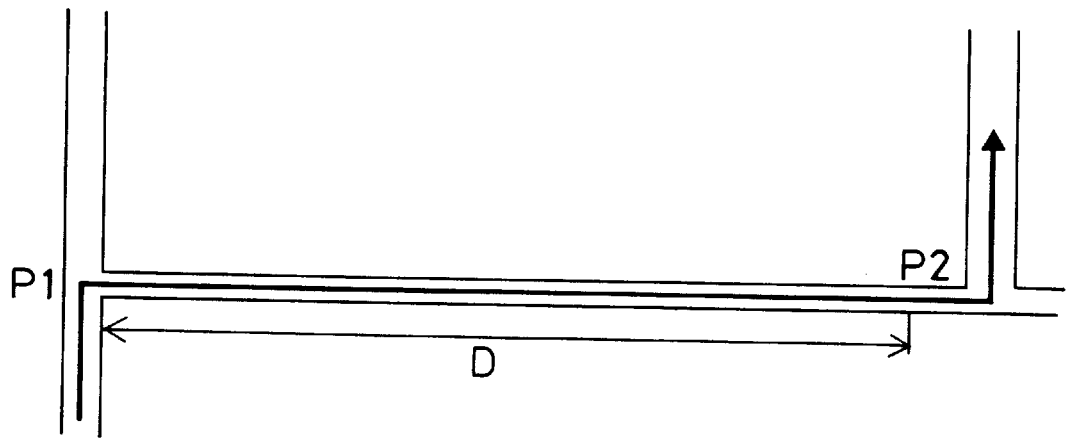
FIGS. 9(A) and 9(B) are map diagrams of a guidance route illustrating processing to acquire guidance object branch points.
Figure 9:
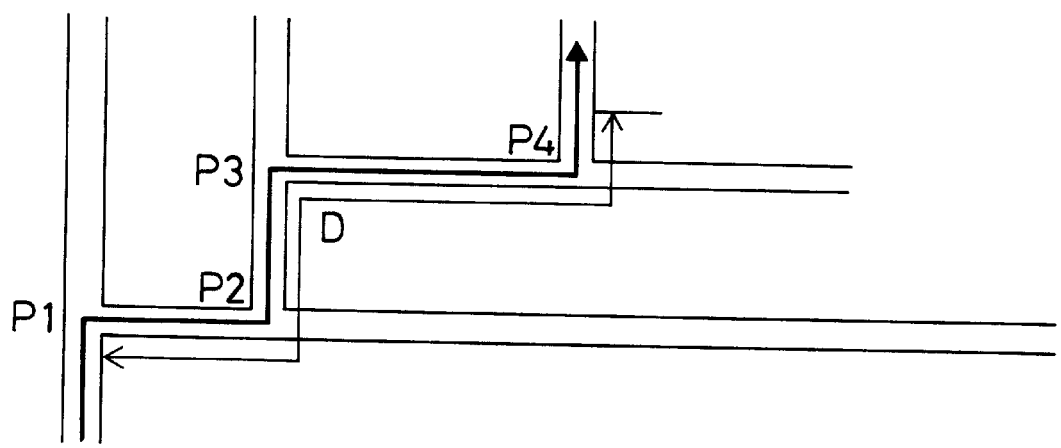
Figure 10:
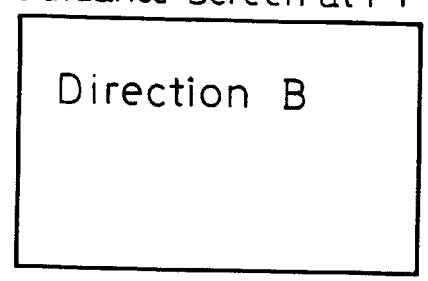
FIGS. 10(a) and 10(b) are views of guidance screens in travelling the route of FIGS. 9(A) and 9(B)
Figure 10:
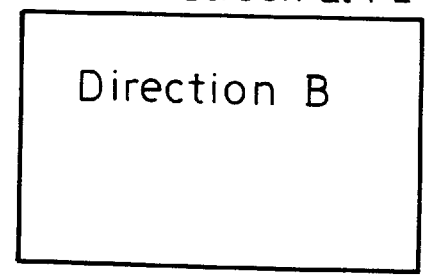

In one embodiment, FIGS. 2($a$), 2($b$), 10($a$) and 10($b$) represent enlargements of small pop-up windows superimposed on the guidance map display, such as FIGS. 9($a$) and 9($b$), adjacent to corresponding branch point; and in another embodiment, FIGS. 2($a$), 2($b$), 10($a$) and 10($b$) represent large pop-up windows substantially replacing the map display. In the case of the large pop-up window, the sign must be removed immediately after passing through the branch point, and in the case of the small pop-up window, the sign can be promptly removed to avoid misrecognition by the driver as a sign for the following branch point.

If, as shown in FIG. 9(b), there are many branch points within the distance D, the comparison in the common name determining procedure performed when approaching the branch point P1 can include, in addition to comparison of the destination names on the guidance sign at P1 with the destination names on the guidance signs at P2, P3 and P4, the comparison of the destination names on the guidance signs for the branch points P2, P3 and P4 with each other. For example, in case there is a direction name common to the branch points P3 and P4, the data may be saved, and direction guidance processing at the branch point P3 may be simplified.

In the above description, the procedure to prepare direction guidance information is started in case there is a guide branch point following the guidance object branch point. However, the processing to prepare direction guidance information may be also started to provide direction guidance when the vehicle is at a point within a given distance from the guidance object branch point or within a given distance in advance of the guidance object branch point and the guidance object branch point has direction information, or in case a guide branch point located within a given distance of the guidance object branch point has direction information, or there are two or more destination names on the guidance sign at the guidance object branch point.

In the present embodiment when the vehicle is within a given distance from the guidance object branch point (the next approaching intersection), guide branch points existing within a given distance from the guidance object branch point are searched, and route direction information is acquired. The direction information thus acquired is compared with the direction information of the guidance object branch point, and the mode of guidance is changed based on the result of the comparison. As a result, the driver can determine where the vehicle should be driven based on specific direction information at the first guide branch point according to the mode of guidance, and the user can easily find the direction information in advance. Even when succeeding guide branch points are closely spaced and direction guidance at a succeeding point is displayed or announced only momentarily before reaching that point, the driver can easily determine the correct direction to drive the vehicle with full confidence.

Figures 11, 12A, 12B:
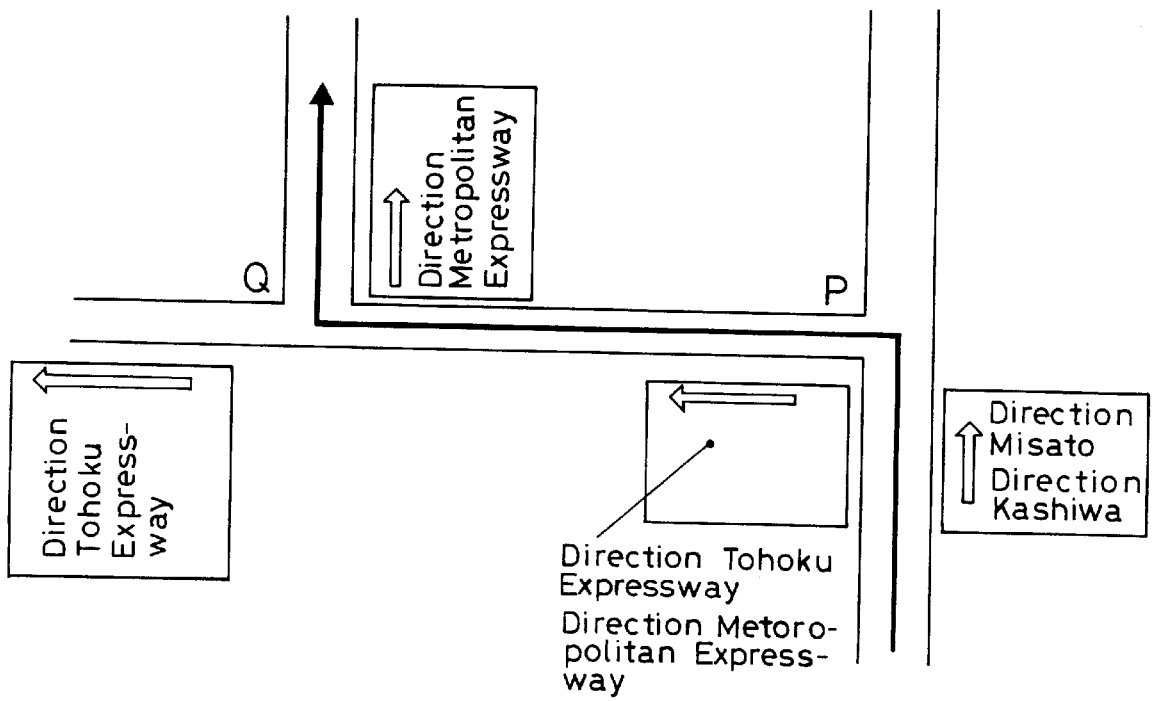
FIG. 11 is a map diagram illustrating direction guidance along a calculated route.
FIGS. 12(a) and 12(b) are views of guidance screens in travelling the route of FIG. 11.

FIG. 11 and FIGS. 12(a) and 12(b) illustrate and example for providing direction guidance for a route leading from the outer loop expressway connecting Tokyo–Saitama–Chiba to the metropolitan expressway. At a branch point P, there are two signs, "Misato; Kashiwa" (with arrow pointing straight ahead), and "Tohoku Expressway; Metropolitan Expressway" (with arrow pointing to left) wherein the latter sign, "Tohoku Expressway; Metropolitan Expressway", is the guidance sign for travel through the intersection P. At a branch point Q, there are two signs, "Metropolitan Expressway" (with arrow point to right) and "Tohoku Expressway" (with arrow pointing straight ahead) wherein the sign "Metropolitan Expressway" is the guidance sign for travel through the intersection Q. In this case, the comparison of the names on the guidance sign at the guidance object branch point P with the names on the guidance sign at the following guide branch point Q determines that the name "Metropolitan Expressway" is common to both guidance signs; thus a sign with only the common name "Metropolitan Expressway" and the left turn arrow is displayed for guidance when the vehicle is at the branch point P as shown in FIG. 12(a); the sign "Metropolitan Expressway" with the right turn arrow is displayed for guidance at the branch point Q.

It is noted that, alternatively or in addition to the direction guidance displayed on screen, guidance by voice may be simultaneously used. In the example of FIG. 9(b), the sign with both names or multiple route information "A" and "B" may be displayed on screen and only the route information "B" may be given by voice. Or, in the example of FIG. 9, two names "A" and "B" may be displayed on screen, and by changing color or contrast, one of these names may be emphasized or highlighted.

Next, description will be given on an example to provide guidance for the name of IC where the vehicle is to be diverted from the course on expressway or toll road, referring to route guidance and display of Step S4 in Fig.

Figure 13:
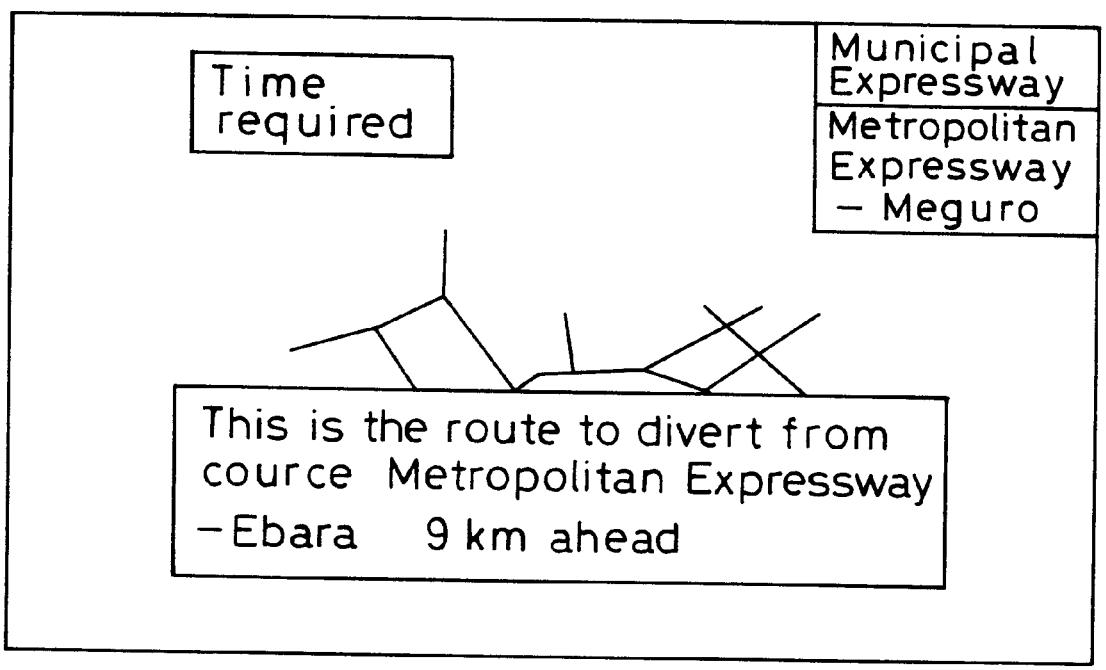
FIG. 13 is a view of a display screen illustrating an IC where the vehicle is to exit from a main road.

FIG. 13 shows a screen displaying a name of an IC where the vehicle is to exit from the course when driving along expressway or toll road.

In the system of the present embodiment, it is designed in such manner that, when the vehicle approaches the next branch point, distance and direction to the branch point are automatically output in voice. Also, when an additional audio switch is operated, distance and direction to the next branch point are output in voice at any time. In the system of the present invention, the additional audio switch is utilized and when the additional audio switch is operated while driving along an expressway or toll road, distance and direction to the next branch point is output in voice. At the same time, the name of an IC where the vehicle is to exit from the roadway is displayed in larger size at the center of the route guidance map screen as shown in FIG. 13, and the remaining distance is also displayed. In FIG. 13, it is displayed that the vehicle is driven along the metropolitan expressway (the nearest IC is Meguro), and that the vehicle is to be diverted or exit from the course at Ebara IC of the metropolitan expressway. The distance to this IC is also displayed as 9 km. This IC name display screen can be closed by key operation, returning to the route guidance map screen. Of course, it may be designed in such manner that the screen is displayed for a given time period and is then automatically closed.

Figure 14:
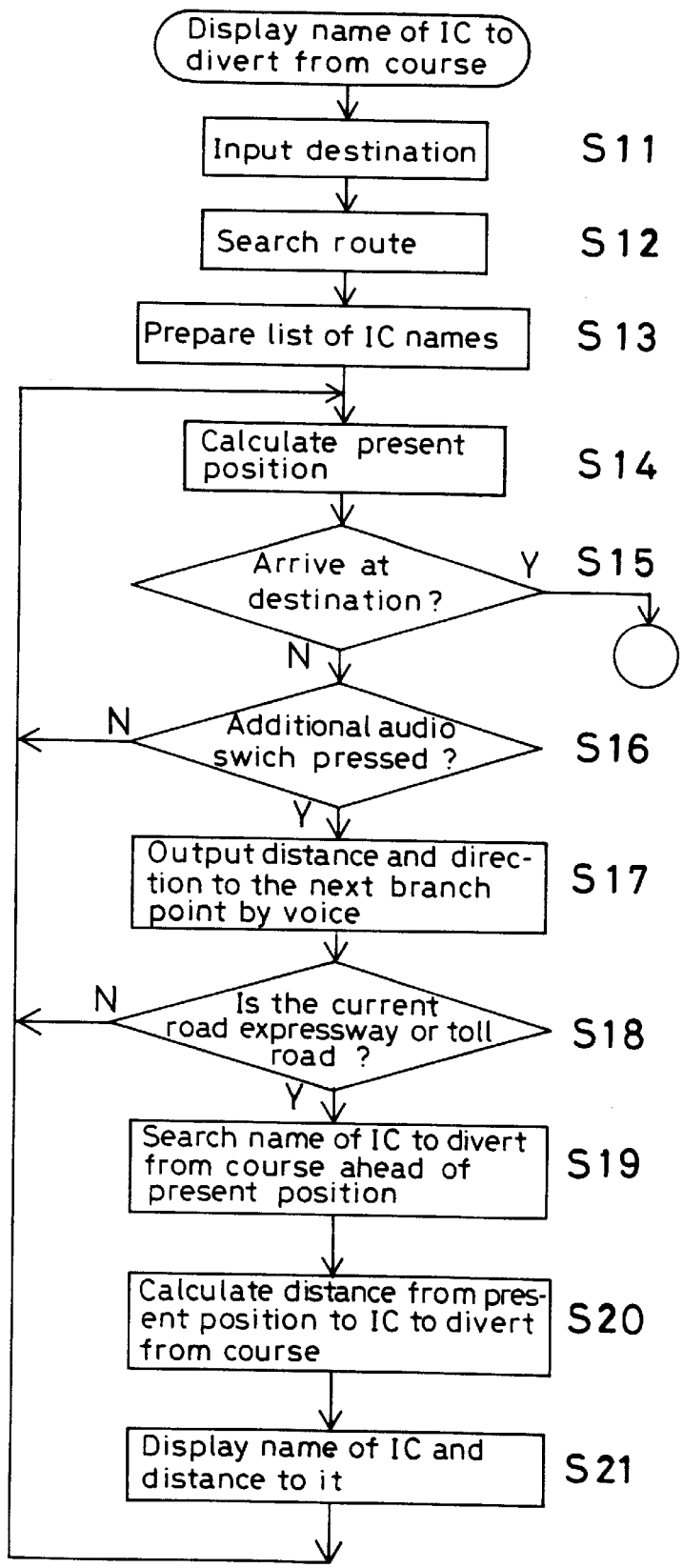
FIG. 14 is a flow chart of a procedure to display a name of an IC according to the present invention.

Next, description will be given on processing to display the name of IC where the vehicle is to be diverted from the course referring to FIG. 14.

When the destination is input by operating the input/output unit 1 shown in FIG. 3, the central processing unit 4 searches a route from the present position to the destination (S11 and S12). If there is an expressway or a toll road on the suggested route, a list of IC names is prepared indicating names and positions of ICs where the vehicle is to enter or to exit from the expressway or toll road (S13) as shown in FIG. 15. When entering the road at an IC, the name "Kita-Ikebukuro" of the IC is given in voice. When the vehicle has entered the road at the IC, the name of the next IC "Nishi-Kanda" is given for guidance. Then, the present position is calculated by the present position detecting unit 2, and it is judged whether the vehicle has arrived at the destination or not (S14 and S15). Next, it is judged whether the additional audio switch has been pressed or not. If pressed, distance and direction to the next branch point are output in voice (S16 and S17). Next, it is checked that the road where the vehicle is currently driven along is an expressway or a toll road or not. If it is expressway or toll road, the present position is compared with the list of IC names and the name of the IC where the vehicle should exit from the roadway is searched. Then, the distance to the IC is calculated, and the IC name thus obtained and the distance to the IC are displayed (S18 and S21). This processing is executed until the vehicle reaches the destination, and it is completed when the vehicle arrives at the destination. When driving along expressway or toll road, even when the additional audio operating means has been operated, proper guidance may not be provided because the distance between the entry point and the exit point on the road is too long. When operation of the additional audio operating means has been operated, it is detected that the vehicle is currently driven along a specific road which has entrance to or exit from expressway or toll road, and the information effective to the operation can be provided by outputting guidance relating to the next intersection (branch point) and by notifying the name of an IC where the vehicle is to exit from the roadway.

In the present embodiment, description has been given on the case relating to expressway or toll road, while it is needless to say that the system of the present invention can be applied to other type of road having IC such as bypass road, overpass, etc.

Further, as the means to notify the name of the IC where the vehicle is to be diverted from the course, it may be calculated at which IC the vehicle should be diverted from the course, i.e. after how many ICs from the present position (position where the additional audio switch has been operated), and the IC where the vehicle is to be diverted from the course may be informed by the number of ICs from the present position, e.g. "This is the route to exit from the course at the third IC." For example, the number of the IC can be obtained by calculating how many ICs are present between the present position and the IC where the vehicle is to exit from the course based on the route information obtained by route searching. Also, by providing each IC with road data, it can be obtained by calculating nodes of the road stored in the route information memory means and existing on the route up to the IC where the vehicle is to exit. Because the distance to the next IC is relatively long when driving along expressway and voice guidance such as "no specific matter for the time being" by the additional audio operating means, the information effective to the operation can be given by providing the name of IC where the vehicle is to exit from the course.

In the present embodiment, when there is an expressway or a toll road in the leading route after the route has been searched, a list of IC names where the vehicle should exit from the course on expressway or toll road and information of positions of ICs are stored in memory. When the name of IC where the vehicle is to exit from the course is guided by the additional audio switch when driving along expressway or toll road, the present position is compared with the list of IC names, and the name of the IC where the vehicle should exit next and the distance to said IC are detected and displayed. In the present invention, the name of the IC where the vehicle is to exit from the course is given when necessary by the additional audio switch, and there is no need to display the name of IC at all times when driving along expressway, and guidance can be given for the name of IC where the vehicle is to exit from the course. At the same time, it is possible to provide guidance for the next branch point by voice.

Next, description will be given on an example to provide information on expected time of arrival at the destination as the vehicle moves, referring to route guidance and display in Step S4 shown in FIG. 7.

Figure 16:
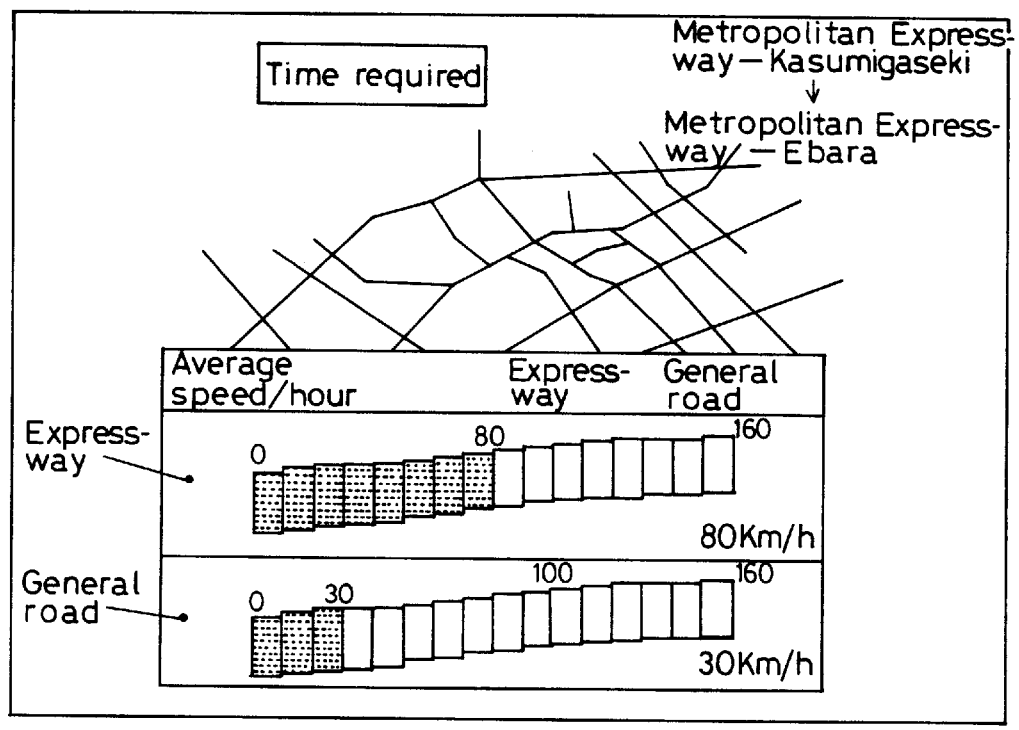
FIG. 16 is a view of a vehicle velocity setting screen of the present invention.

FIG. 16 is a drawing to show a vehicle velocity setting screen. This is popped up in lower portion of the guidance map screen by operating the operation key provided on the input/output unit of FIG. 3. The vehicle velocity is displayed in graph in the range from 0 to 160 km/h for expressway and general road. By changing the shaded portion on the screen using a vehicle velocity setting key, the velocity can be selected. In case the user can receive congestion information or time required on the road at real time by communication means such as VICS, the vehicle velocity to cope with the actual condition can be set by taking the road condition into consideration. For example, by considering driving condition such as unexpected congestion due to traffic accident or road construction, the vehicle velocity is set. In the example shown in the figure, it is set to 80 km/h for expressway and 30 km/h for general road. When the setting is completed, it is returned to the pop-up screen of the vehicle velocity setting, and the route guidance view is displayed.

Figure 17:
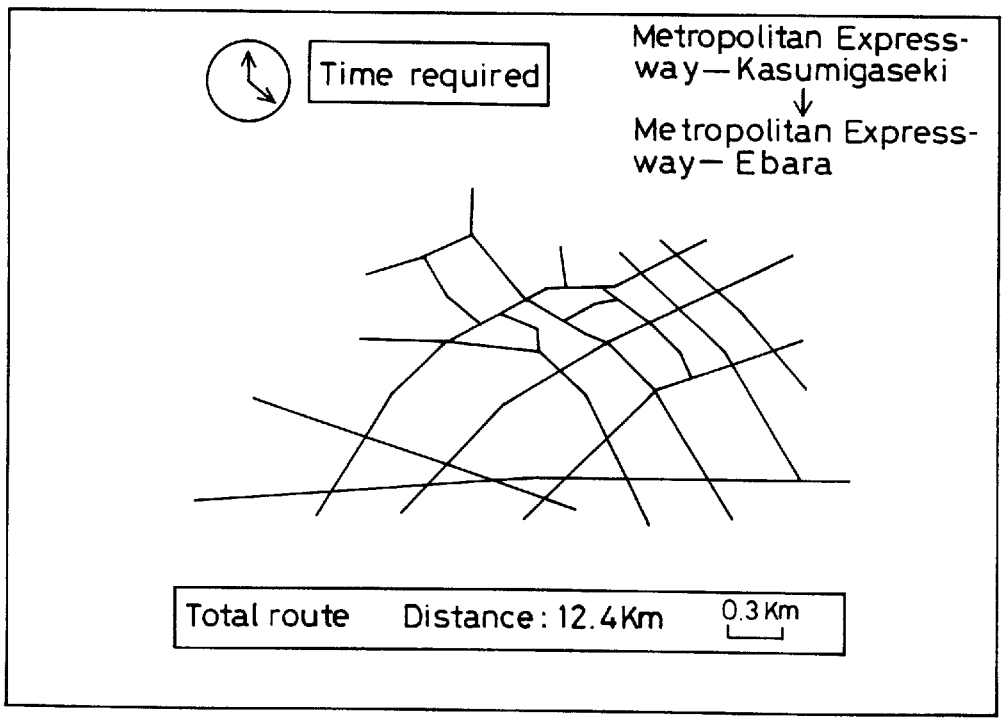
FIG. 17 is a view of a screen to display expected time of arrival.

When average vehicle velocity is set for each road type such as expressway, general road, etc., expected time to arrive the destination is calculated by the processing to be described later. Because the vehicle velocity for each road type is set by taking road condition into consideration, the expected time of arrival is properly calculated according to the driving conditions. The expected time of arrival thus calculated is displayed in a clock provided at a position easy to look at in upper portion of the guidance screen as shown in FIG. 17, and it is output in voice if necessary.

Figure 18:
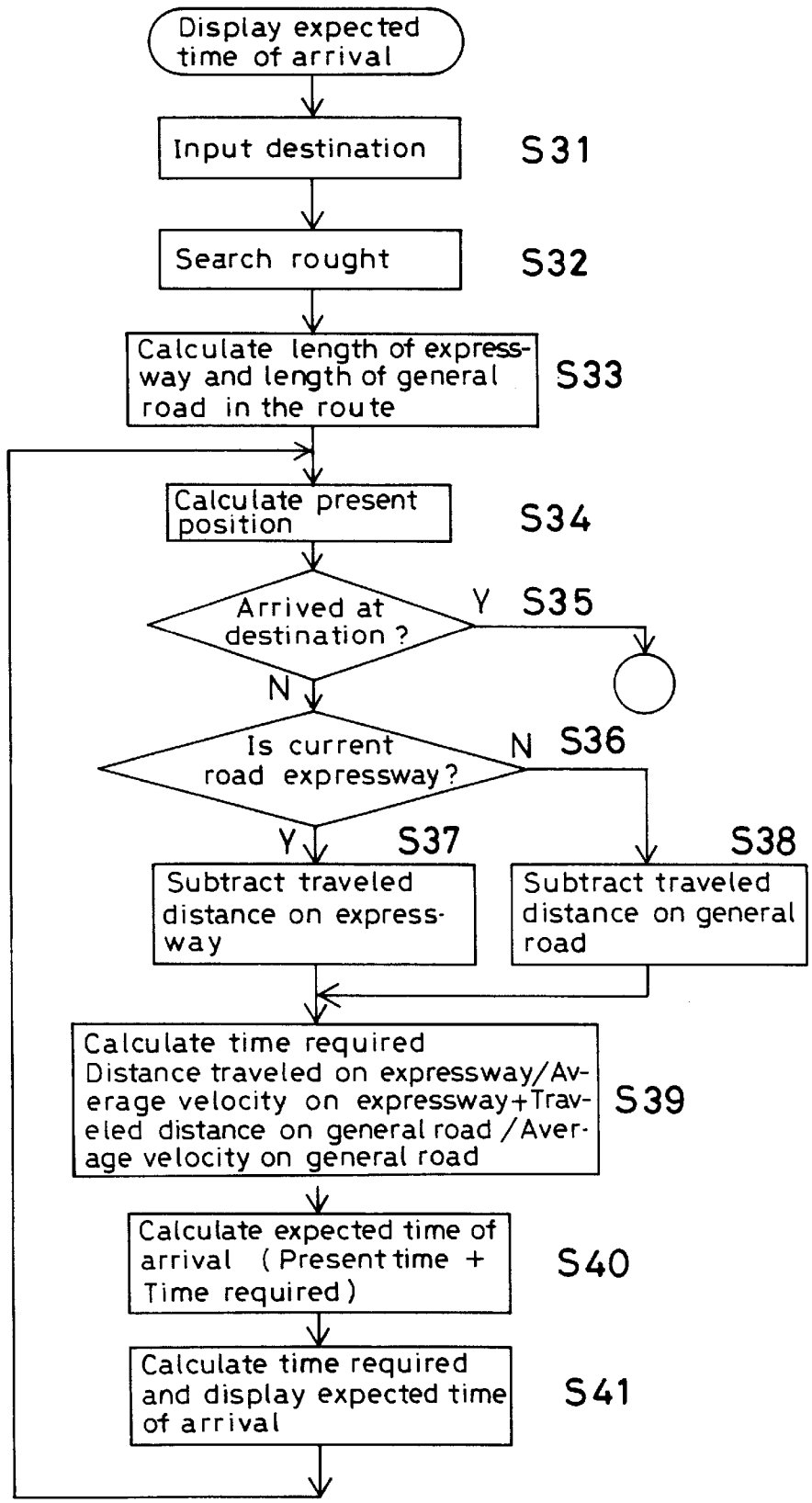
FIG. 18 is a flow chart of a procedure of processing to display the expected time of arrival according to the present invention.

Next, description will be given on processing to display the expected time of arrival referring to FIG. 18.

When the destination data is input by the input/output unit 1 of FIG. 3, the central processing unit 4 searches a route from the present position to the destination and calculates length of expressway and length of general road in the searched route (S31 to S33). Next, the present position is calculated by the present position detecting unit 2, and it is judged whether the vehicle has arrived at the destination or not (S34 and S35). Next, it is judged whether the road where the vehicle is currently driven is expressway or general road by referring to road name data of the information storage unit 3, and the remaining distance to the destination is obtained by subtracting the traveled distance from the length of expressway and length of general road calculated in the beginning (S36 to S38). Next, the remaining distance thus obtained is divided by average vehicle velocity on expressway and general road set on the screen of FIG. 16 to obtain the time required to drive along expressway and general road. By adding these values, the time required from the present position to the destination is calculated (S39 and S40). The time required thus calculated is added to the time on the clock 49 of the central processing unit, 5 and the expected time of arrival is obtained and displayed (S41). When this processing is executed until the vehicle reaches the destination, the processing is completed.

As described above, the remaining distance on the route can be calculated for each road type such as expressway or general road, and the time required can be accurately obtained by setting average vehicle velocity for each road type. Also, a means is provided so that the user can operate and set the average vehicle velocity. As a result, the time required to match the desired driving condition can be calculated.

In calculating the expected time of arrival, the driving time can be calculated at average vehicle velocity suitable for each type of road by weighted processing corresponding to road type, road width and number of intersections, and it is possible to calculate the expected time of arrival properly and to provide guidance. In the weighted processing, the expected time of arrival can be calculated by adding or totalizing a given value or values to the distance of each road. For instance, to actual length of 1 km of national road, the time can be calculated by assuming that actual length of prefectural road is by 1.5 times of that of national road, i.e. prefectural road is 1.5 km in length. Also, the expected time of arrival may be calculated by changing, not the distance but the average vehicle velocity itself, i.e. by adding or subtracting a given value.

The expected time of arrival may be automatically calculated by utilizing external information obtained by the beacon receiver 22 and the data transceiver 23, or the expected time of arrival may be calculated by manual operation based on the obtained external information. In particular, in case information from an external organization such as VICS, ATIS, etc. is utilized, the data of road condition on the route ahead can be added in the calculation of the expected time of arrival, and accuracy of the time calculation is improved. Even when external information such as VICS, ATIS, etc. can be utilized, the information for all roads may not be necessarily obtained. Therefore, by calculating the expected time of arrival based on the remaining distance as in the present invention, proper guidance can be provided for calculation of the expected time of arrival even in case the external information is not available.

In the present embodiment, expected time of arrival at the destination is calculated and guided as the vehicle moves. Also, by making it possible to set average vehicle velocity for each road type and by changing average vehicle velocity as the driver wishes, it is possible to estimate the time of arrival at high accuracy. Because the remaining distance from the present position to the destination is calculated for each road type and expected time of arrival is calculated and displayed based on the remaining distance, the time of arrival is not deviated from the calculated time due to waiting for traffic signal at intersection or when the vehicle is to be stopped or delayed due to traffic congestion, and proper guidance can be given on the expected time of arrival at the destination.

What we claim is:

1. In a vehicle navigation system having means for calculating a route from a present position of a vehicle to a destination and means for providing pop-up signs with route information for guidance through branch points based on the calculated route, the improvement comprising:

means, responsive to the vehicle being within a first given distance from a next approaching branch point requiring guidance, for searching for guide branch points existing along the route within a second given distance following the next approaching branch point;

means for acquiring pop-up sign route information for any next following guide branch point found by said searching means;

means for comparing said acquired route information with route information of the next approaching branch point; and means for eliminating non-common route information from the pop-up sign of the next approaching branch point according to the result of the comparing means.

2. A navigation system for vehicles comprising:

present position detecting means for calculating the present position of the vehicle;

input means for inputting information necessary for calculating the route;

output means for outputting information for route guidance;

information memory means for storing all data necessary for providing guidance including direction information;

route calculating means for calculating the route based on the information input by said input means;

route information memory means for storing guidance information of the route calculated by said route calculating means;

guidance control means for reading the route guidance information of a next approaching branch point from said route information memory means based on the route calculated by said route calculating means and on the present position detected by said present position detecting means and for outputting said route guidance information for said next approaching branch point to said output means, means for determining guide branch points existing within a given distance following said next approaching branch point stored in said route information memory means when the present position detected by said present position detecting means is within a given distance from the next approaching branch point, means for acquiring route guidance information of any next following guide branch point following the next approaching branch point, means for comparing the route guidance information of said next following guide branch point with the route guidance information of said next approaching branch point, and means for changing the route guidance information of said next approaching branch point for output by said output means based on the results of the comparison.

3. A navigation system for vehicles according to claim 2, wherein said means for changing the route guidance information of said next approaching branch point controls the guidance control means to output to said output means only matching guidance information found by said comparing means.

4. A navigation system for vehicles according to claim 2, wherein said output means comprises a display means, and said means for changing the route guidance information of said next approaching branch point controls said display means so that matching guidance information is displayed with emphasis by said display means.

5. A navigation system for vehicles according to claim 2, wherein said output means comprises a display means and a voice announcing means, the route guidance information of the next approaching branch point is output to said display means, and only matching guidance information found by said comparing means is output in voice by said voice announcing means.

6. A navigation system for vehicles for calculating a route from the present position of a vehicle to a destination and providing guidance of the calculated route, comprising:

means for searching a guidance object branch point to be guided next and acquiring route guidance information of the guidance object branch point;

means for further acquiring route guidance information on a route ahead of said next guidance object branch point;

means for comparing the acquired route guidance information at the next guidance object branch point with the route guidance information on the route ahead of the next guidance object branch point; and means for determining output route guidance information to be output based on the result of the comparison.

7. A navigation system for vehicles according to claim 6, wherein the output route guidance information is information on advancing direction.

8. A navigation system for vehicles according to claim 6, wherein the output route guidance information is determined based on matching degree in the result of the comparison.

9. A navigation system for vehicles according to claim 6, wherein the output rotue guidance information is only route guidance information most matching in the result of the comparison.

10. A navigation system for vehicles according to claim 6, further comprising:

present position detecting means for calculating the present position of the vehicle;

input means for inputting information necessary for calculating the route;

output means for outputting the output route guidance information from said determining means;

information memory means for storing all data necessary for providing guidance including direction information;

route calculating means for calculating the route based con the information input by said input means;

route information memory means for storing guidance information of the route calculated by said route calculating means; and said searching means including guidance control means for reading the route guidance information of the next guidance object branch point from said route information memory means based on the route calculated by said route calculating means and on the present position detected by said present position detecting means and for outputting said route guidance information for said next approaching branch point to said output means.

* * * * *

UNITED STATES PATENT AND TRADEMARK OFFICE
CERTIFICATE OF CORRECTION

PATENT NO. : 5,928,308
DATED : July 27, 1999
INVENTOR(S) : NANBA et al

It is certified that error appears in the above-identified patent and that said Letters Patent is hereby corrected as shown below:

Col. 14, line 4, "con" should read "on".

Signed and Sealed this

Twenty-seventh Day of March, 2001

Attest:

NICHOLAS P. GODICI

*Attesting Officer*   Acting Director of the United States Patent and Trademark Office